(12) United States Patent
Wu

(10) Patent No.: US 8,335,350 B2
(45) Date of Patent: Dec. 18, 2012

(54) EXTRACTING MOTION INFORMATION FROM DIGITAL VIDEO SEQUENCES

(75) Inventor: Hao Wu, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 70 days.

(21) Appl. No.: 13/033,962

(22) Filed: Feb. 24, 2011

(65) Prior Publication Data

US 2012/0219174 A1 Aug. 30, 2012

(51) Int. Cl.
*G06K 9/00* (2006.01)
*H04N 7/14* (2006.01)

(52) U.S. Cl. .............................. 382/103; 348/14.01

(58) Field of Classification Search .......... 382/103, 382/107, 164, 171, 173, 190, 236, 284; 348/169, 348/170, 171, 172, 218.1, 317, 415.1, 430.1, 348/474, 490, 584, 586, 905, 14.01, 14.1, 348/430, 71, 5; 375/240.01; 725/20, 31, 725/63, 73
See application file for complete search history.

(56) References Cited

U.S. PATENT DOCUMENTS

| | | | |
|---|---|---|---|
| 6,411,339 B1 | 6/2002 | Akutsu et al. | |
| 7,042,493 B2 * | 5/2006 | Prandoni et al. | 348/157 |
| 8,170,278 B2 * | 5/2012 | Zhao et al. | 382/103 |
| 2006/0274156 A1 | 12/2006 | Rabbani et al. | |

OTHER PUBLICATIONS

Akutsu et al., "Video tomography: an efficient method for camerawork extraction and motion analysis," Proc. second ACM International Conference on Multimedia, pp. 349-356 (1994).

Ngo et al., "Motion Analysis and Segmentation through Spatio-Temporal Slices Processing," IEEE Trans. Image Processing, vol. 12, pp. 341-355, (2003).
Tonomura et al., "VideoMAP and VideoSpaceIcon: tools for anatomizing video content," Proc. Interact '93 and CHI '93 Conference on Human Factors in Computing Systems, pp. 131-136 (1993).
Joly et al., "Efficient automatic analysis of camera work and microsegmentation of video using spatiotemporal images," Signal Processing: Image Communication, vol. 8, pp. 295-307 (1996).
Milanfar, "Projection-based, frequency—domain estimation of superimposed translation motions," J. Opt. Soc. Am. A, vol. 13, pp. 2151-2161 (1996).
Niyogi et al., "Analyzing gait with spatiotemporal surfaces," IEEE Workshop on Motion of Non-Rigid and Articulated Objects, pp. 64-69 (1994).
Sarkar et al., "Perceptual organization based computational model for robust segmentation of moving object," Computer Vision and Image Understanding, vol. 86, pp. 141-170 (2002).

(Continued)

*Primary Examiner* — Abolfazl Tabatabai
(74) *Attorney, Agent, or Firm* — Kevin E. Spaulding

(57) ABSTRACT

A method for analyzing a digital video sequence of a scene to extract background motion information and foreground motion information, comprising: analyzing at least a portion of a plurality of image frames captured at different times to determine corresponding one-dimensional image frame representations; combining the one-dimensional frame representations to form a two-dimensional spatiotemporal representation of the video sequence; using a data processor to identify a set of trajectories in the two-dimensional spatiotemporal representation of the video sequence; analyzing the set of trajectories to identify a set of foreground trajectory segments representing foreground motion information and a set of background trajectory segments representing background motion information; and storing an indication of the foreground motion information or the background motion information or both in a processor-accessible memory.

27 Claims, 15 Drawing Sheets

OTHER PUBLICATIONS

Uomori et al., "Automatic image stabilizing system by full-digital signal processing," IEEE Transactions on Consumer Electronics, vol. 36, pp. 510-519 (1990).

Ester et al., "A density-based algorithm for discovering clusters in large spatial databases with noise," Proc. Second International Conference on Knowledge Discovery and Data Mining, pp. 226-231 (1996).

\* cited by examiner

EXTRACTING MOTION INFORMATION FROM DIGITAL VIDEO SEQUENCES

CROSS-REFERENCE TO RELATED APPLICATIONS

Reference is made to commonly assigned, co-pending U.S. patent application Ser. No. 13/034,010, entitled: "Method for Providing a Stabilized Video Sequence", by Hao Wu, which is incorporated herein by reference.

FIELD OF THE INVENTION

This invention pertains to the field of video image processing, and more particularly to a method for extracting foreground and background motion information from a digital video sequence.

BACKGROUND OF THE INVENTION

Detecting and tracking independent moving objects in video sequences are two fundamental computer vision tasks that have broad applications in video analysis and processing. Most of the current moving object detection algorithms are based on analysis of a sequence of individual video images in the spatial domain on a frame-by-frame basis. Object tracking algorithms typically require the use of object detection algorithms or human input to initialize the objects that should be tracked, and are also generally applied on a frame-by-frame basis.

One of the most common approaches to moving object detection is based on background subtraction, where differences are calculated between the current frame and a reference background frame. Large pixel differences are used as indications of motion probability. This approach can work well in controlled settings, such as with static camera positions, and with constant or slowly changing illumination. However, background subtraction methods break down when these conditions are not satisfied.

A variation of this approach involves computing differences between successive frames of the video sequence. Typically, the differences are determined after a stabilization or frame registration process has been applied in order to distinguish between background motion and foreground object motion. Both the background subtraction and frame differencing strategies provide difference images indicating image pixels that have changed. However, the identification of the moving object regions from these difference images remains a difficult problem.

Another popular approach to detect moving objects is based on applying an optical flow estimation process to analyze the video sequence. A flow field segmentation algorithm is then used to identify regions of coherent motion. While optical flow algorithms provide pixel-level motion vectors, they are computationally intensive and are inevitably sensitive to noise.

Akutsu et al., in the article "Video tomography: an efficient method for camerawork extraction and motion analysis" (Proc. Second ACM International Conference on Multimedia, pp. 349-356, 1994), teach a method to extract lens zoom, camera pan and camera tilt information from a video sequence using a motion analysis technique. According to this method, the video is represented as a three-dimensional (3-D) spatiotemporal function. Cross-sections are taken through the 3-D spatiotemporal function to provide a two-dimensional (2-D) spatiotemporal representation with one spatial dimension and one time dimension. A Hough transform is applied to the 2-D spatiotemporal representation to extract zooming and panning parameters. This approach does not provide a means to separate the motion pattern of foreground objects from the motion pattern of the background caused by the zooming and panning of the video camera in the two-dimensional representation.

U.S. Pat. No. 6,411,339 to Akutsu et al., entitled "Method of spatio-temporally integrating/managing a plurality of videos and system for embodying the same, and recording medium for recording a program for the method," uses a similar motion analysis method to estimate video camera motion. The determined camera motion is then used to align the video frame backgrounds so that foreground objects can be identified by computing differences between the aligned video frames.

Joly et al., in the article "Efficient automatic analysis of camera work and microsegmentation of video using spatiotemporal images" (Signal Processing: Image Communication, Vol. 8, pp. 295-307, 1996), teach a method for analyzing a video sequence to characterize camera motion. The method involves determining a 2-D spatiotemporal representation similar to the one described by Akutsu et al. Trace lines are determined by quantizing the 2-D spatiotemporal representation and finding boundaries between the quantized regions. Camera motion is then inferred by analyzing the pattern of the trace lines using Hough transforms. This method does not provide a means to separate the motion pattern of foreground objects from the motion pattern of the background caused by the zooming and motion of the video camera.

Ngo et al., in the article "Motion analysis and segmentation through spatio-temporal slices processing" (IEEE Trans. Image Processing, Vol. 12, pp. 341-355, 2003), describe a method for analyzing motion in a video image sequence using spatiotemporal slices. As with the method of Akutsu et al., the video is represented as a 3-D spatiotemporal function. The method involves using tensor analysis to determine motion information by analyzing the orientation of local structures in a 2-D spatiotemporal slice through the 3-D spatiotemporal space. Since a particular slice will only intersect a line through the video frames, it is necessary to consider a large number of slices, which adds computational complexity. A clustering algorithm is applied based on color similarity to segment the video frames into background and foreground objects so that objects with different colors can be separated from the background. Another approach proposed in the same article for separating moving objects from the background uses background subtraction in the spatial domain. The background image is reconstructed based on a detected dominant motion in spatiotemporal slices.

Niyogi et al., in the article "Analyzing gait with spatiotemporal surfaces" (IEEE Workshop on Motion of Non-Rigid and Articulated Objects, pp. 64-69, 1994), describe a method for analyzing patterns in spatiotemporal representations of a video sequence to evaluate gait of a walking individual. A stationary camera position is used and moving objects are identified by detecting changes in the captured images. Hough transforms are used in the process of determining a spatiotemporal surface associated with the moving object.

Sarkar et al., in the article "Perceptual organization based computational model for robust segmentation of moving object" (Computer Vision and Image Understanding, Vol. 86, pp. 141-170, 2002), teach a method for analyzing a video based on forming a 3-D spatiotemporal volume to find perceptual organizations. The method involves applying a 3-D edge detection process to the 3-D spatiotemporal volume and then using a Hough transform to detect planar structures in the 3-D data.

There remains a need for a computationally efficient method for analyzing video sequences to determine foreground and background motion estimates.

SUMMARY OF THE INVENTION

The present invention represents a method for analyzing a digital video sequence of a scene to extract background motion information and foreground motion information, the digital video sequence being captured by a digital video camera and having a time sequence of image frames, each image frame having a two-dimensional array of image pixels, comprising:

using a data processor to analyze at least a portion of a plurality of image frames captured at different times to determine corresponding one-dimensional image frame representations having an associated spatial dimension;

combining the one-dimensional frame representations for the plurality of image frames to form a two-dimensional spatiotemporal representation of the video sequence, one of the dimensions being a time dimension and the other dimension being the spatial dimension associated with the one-dimensional image frame representations;

using a data processor to identify a set of trajectories in the two-dimensional spatiotemporal representation of the video sequence, each trajectory corresponding to a structure in the two-dimensional spatiotemporal representation of the video sequence and representing the spatial position of a feature in the video sequence as a function of time;

using a data processor to analyze the set of trajectories to identify a set of foreground trajectory segments representing foreground motion information and a set of background trajectory segments representing background motion information; and storing an indication of the foreground motion information or the background motion information or both in a processor-accessible memory.

This invention has the advantage that foreground and background motion information is determined in a manner that produces high quality motion estimates using less computer processing time and less computer memory than prior art methods.

It has the additional advantage that it provides more comprehensive motion information relative to other prior art methods that determine motion estimates using 2-D spatiotemporal representations of a video sequence.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
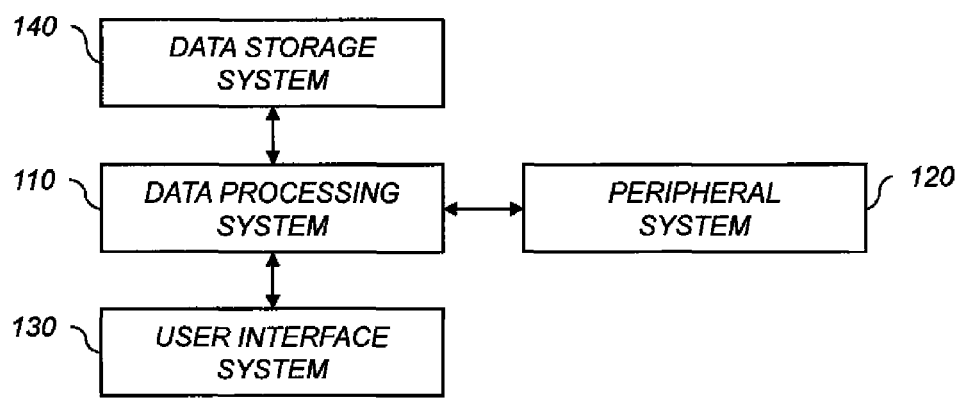
FIG. 1 is a high-level diagram showing the components of a system for extracting motion information from a digital video sequence according to an embodiment of the present invention.

FIG. 1 is a high-level diagram showing the components of a system for analyzing a digital video sequence of a scene to extract background motion information and foreground motion information according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, magnetic tapes, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

The present invention will now be described with reference to FIG. 2, which shows a flowchart of a method for determining foreground and background object motion according to a preferred embodiment. The input to the process is a video sequence 200 of a scene having a time sequence of image frames, each image frame having a two-dimensional (2-D) array of image pixels. The video sequence 200 will generally be captured using a digital video camera. In some applications, the video sequence 200 can be a computer-generated video sequence, or can include digitized image frames formed by digitizing a motion picture captured using motion picture film.

A determine one-dimensional (1-D) image frame representations step 205 is used to determine 1-D image frame representations 210 for a plurality of image frames from the video sequence 200 captured at different times. In a preferred embodiment, the 1-D image frame representation 210 for a particular image frame is determined by applying an integral transform to sum the image pixel values in columns of the image frame. (As will be discussed later, in some embodiments, the pixel values may be summed for only a portion of the pixels in each column.) Alternately, the integral transform can sum the image pixel values in rows of the image frame, or along some other set of paths through the image frame (e.g., diagonal lines, or curved paths). In an alternate embodiment, the 1-D image frame representations 210 can be determined by extracting a trace through the corresponding image frames. For example, a row of pixels through the center of the image frame can be extracted and used as the 1-D image frame representation 210.

Typically, the video sequence 200 will be a color video sequence having color image frames with color image pixels, wherein the color image pixels have a plurality color values corresponding to a plurality of color channels associated with a color space used to encode the color image frames. Examples of color spaces that are commonly used to encode color image frames include RGB color spaces and $YC_RC_B$ color spaces.

In a preferred embodiment, the color image frames are processed to provide monochrome image frames having monochrome color values for processing by the determine 1-D image frame representations step 205. In some embodiments, the monochrome image frames can be formed by simply using one of the color channels of the color image frames (e.g., the G color channel of an RGB color space, or the Y color channel of a $YC_RC_B$ color space). In other embodiments, the monochrome color values can be determined by combining the color values from a plurality of color channels. For example, the monochrome color values can be determined by forming a weighted summation of the R, G and B color channels of an RGB color space. Preferably, the monochrome color values are an estimate of a pixel luminance.

A form 2-D spatiotemporal representation step 215 is used to combine the 1-D image frame representations 210 to form a 2-D spatiotemporal representation 220. One of the dimensions of the 2-D spatiotemporal representation 220 is the spatial dimension associated with the 1-D image frame representations 210, and the other dimension is a time dimension. As will be discussed in more detailed later, in a preferred embodiment the 2-D spatiotemporal representation 220 is formed by stacking a set of 1-D image frame representations 210 corresponding to image frames captured at different times to form a 2-D array of pixels where each row of the 2-D array is a different 1-D image frame representation 210 corresponding to a different image capture time.

An identify trajectories step 225 is used to analyze the 2-D spatiotemporal representation 220 to identify a set of trajectories 230. Each trajectory corresponds to a structure in the 2-D spatiotemporal representation 220, and represents the spatial position of a feature in the video sequence as a function of time. In the context of the present invention, a trajectory can be defined to be a path through the 2-D spatiotemporal representation 220 including a set of related points. Typically, a trajectory will include one or more sets of connected points.

In some embodiments, the identify trajectories step 225 forms a trajectory map comprising a 2-D array of pixels, where the pixels included in a particular trajectory 230 are labeled with a trajectory number. The identify trajectories step 225 can identify the trajectories 230 according to any method known in the art. More details about the identification of the trajectories 230 according to a preferred embodiment will be discussed later.

The trajectories 230 are analyzed to determine which ones are associated with background motion and which ones are associated with foreground object motion. Specifically, an identify foreground and background trajectory segments step 235 is used to identify a set of foreground trajectory segments 240 and a set of background trajectory segments 250. Indications of the foreground motion determined in accordance with the resulting foreground trajectory segments 240 are stored in a processor-accessible memory using a store indication of foreground motion step 245. Similarly, indications of the background motion determined in accordance with the resulting background trajectory segments 250 are stored in a processor-accessible memory using a store indication of background motion step 255. As discussed earlier, the processor-accessible memory can be any type of memory such as a magnetic tape, a hard disk or a RAM.

In some embodiments, the indications of the foreground and background motion are stored temporarily (e.g., in RAM) for use in a later processing step. For example, the indications of the foreground and background motion can be used as data for use in an image stabilization process. Alternately, the indications of the foreground and background motion may be archived in association with the video sequence 200. For example, the indications of the foreground and background motion can be stored as metadata in a digital file used to store the video sequence 200 on a digital video tape. In some embodiments, only an indication of the foreground motion may be stored and information about the background motion may be discarded. Similarly, in other embodiments, only an indication of the background motion may be stored and information about the foreground motion may be discarded.

Figure 3:
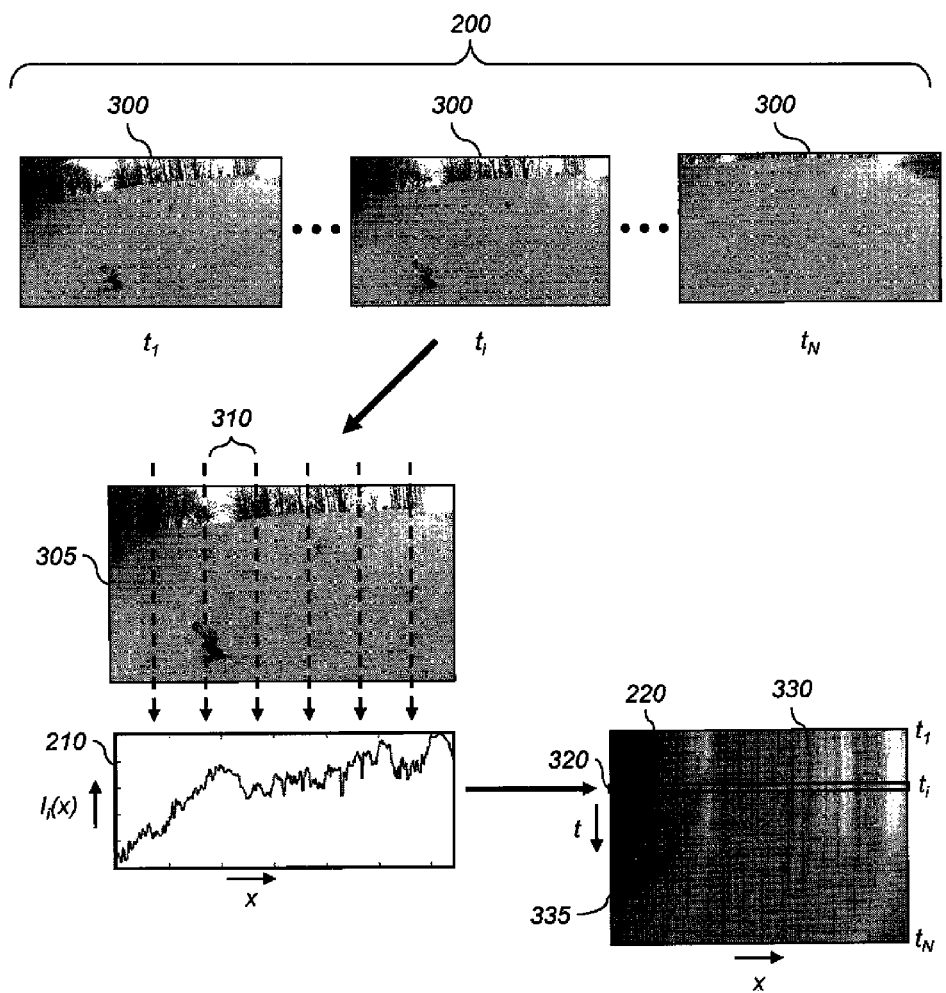
FIG. 3 illustrates the steps involved with the formation of the 2-D spatiotemporal representation of video sequence.

FIG. 3 illustrates the steps involved with the formation of the 2-D spatiotemporal representation 220 according to one embodiment. A video sequence 200 is shown having N image frames 300 captured at capture times $t_i=t_1$ to $t_N$. In some embodiments, the image frames 300 may include every image frame in the captured video sequence 200. In other embodiments, the image frames 300 may include only a subset of the image frames. For example, the video sequence 200 can be sub-sampled so that the image frames 300 include only every fourth frame. In some embodiments, the image frames 300 can be at the original resolution of the image frames in the video sequence. Alternately, the image frames in the video sequence can be down-sampled to a lower resolution to form the image frames 300.

A 1-D image frame representation 210 is formed from each of the image frames 300. In this illustration, a particular image frame 305 captured at time $t_i$ is processed by applying integral transforms along a set of integration paths 310 to determine a corresponding 1-D image frame representation 210. In a preferred embodiment, the integration paths are vertical lines through the particular image frame 305, so that the integral transformed can be expressed as:

$$I_i(x) = \sum_{y=1}^{N_y} f_i(x, y) \qquad (1)$$

where $f_i(x,y)$ are the pixel values for the $i^{th}$ image frame, $I_i(x)$ is the corresponding 1-D image frame representation 210, x and y are column and row indices, respectively, and $N_y$ is the number of rows in the image frame. It can be seen that structures in the 1-D image frame representation 210 have a correspondence to features in the particular image frame 305.

The 2-D spatiotemporal representation 220 is formed by combining the 1-D image frame representations 210 for the plurality of video frames 300, each 1-D image frame representation 210 being used as a corresponding row 320 in the 2-D spatiotemporal representation 220. It can be seen that the various structures in the 1-D image frame representations 210 combine to form 2-D structures in the 2-D spatiotemporal representation 220. The 2-D structures contain information about the spatial position of a feature in the video sequence as a function of time.

Some of the 2-D structures are foreground structures 335 that correspond to motion of foreground objects in the scene. Other 2-D structures are background structures 330 that correspond to motion of background objects in the scene. In many cases, the background objects in the scene are actually stationary, and the apparent motion of the background objects is caused by a motion or zooming of the video camera. If both the video camera and the background are stationary and the zoom setting of the video camera is not adjusted, then the background structures 330 will be constant along vertical paths. If the video camera is moved to the left or right, the background structures 330 will be translated to the right or left in a corresponding fashion. If the zoom setting of the video camera lens is adjusted, the size of the background structures 330 will grow or shrink accordingly.

The identify trajectories step 225 (FIG. 2) is used to identify trajectories corresponding to the background structures 330 and the foreground structures 335 in the 2-D spatiotemporal representation 220. A trajectory will be a representation of the spatial position of a feature in the video sequence 200 as a function of time.

Figure 4:
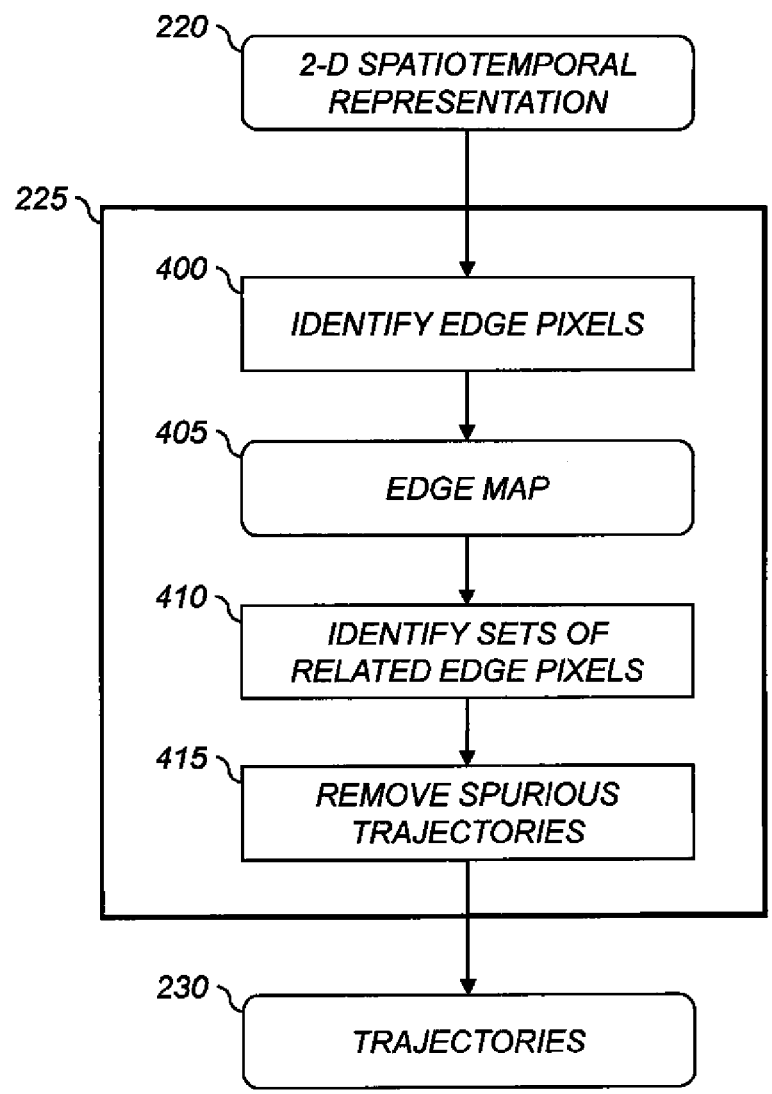
FIG. 4 is a flowchart showing additional details for the identify trajectories step of FIG. 2 according to one embodiment.

FIG. 4 is a flowchart showing additional details for the identify trajectories step 225 according to a preferred embodiment. An identify edge pixels step 400 is used to identify an edge map 405 identifying a set of edge pixels corresponding to edges of the features in the 2-D spatiotemporal representation 220. The edge pixels can be identified using any method known in the art. In a preferred embodiment, the well-known Canny edge detection operation is applied to the 2-D spatiotemporal representation 220 to form a binary edge map 405 identifying the set of edge pixels.

Other types of edge detection operations that can be used in accordance with the present invention would include the well-known Sobel edge detection operation and other similar methods which identify edges using gradient or Laplacian operators. In a preferred embodiment, ones in the edge map 405 are used to represent edge pixels, and zeros in the edge map 405 are used to represent non-edge pixels.

Figure 5A:
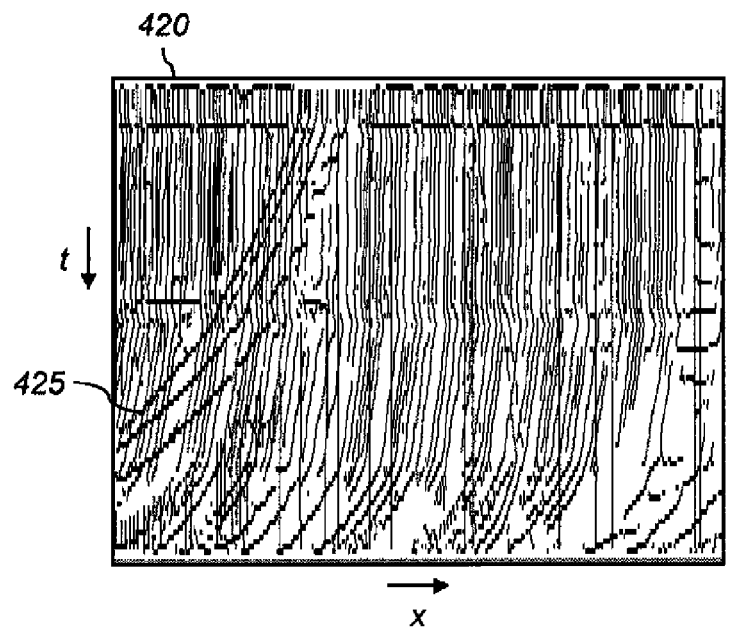
FIG. 5A shows an example of an edge map.

FIG. 5A shows an example of an edge map 420 that includes a set of edge pixels 425. The edge map 420 was determined by applying an edge detection operation to the 2-D spatiotemporal representation 220 shown in FIG. 3.

Returning to a discussion of FIG. 4, an identify sets of related edge pixels step 410 is used to analyze the edge map 405 to identify a set of trajectories 230. Each trajectory 230 includes a set of related edge pixels in the edge map 405 corresponding to a structure in the 2-D spatiotemporal representation 220, and represents the spatial position of a feature in the video sequence 200 as a function of time. Generally, the set of related edge pixels that comprise a particular trajectory 230 will include one or more sets of connected edge pixels that touch each other. The identify sets of related edge pixels step 410 can use any method known in the art for identifying sets of connected or related pixels in a digital image.

Figure 5B:
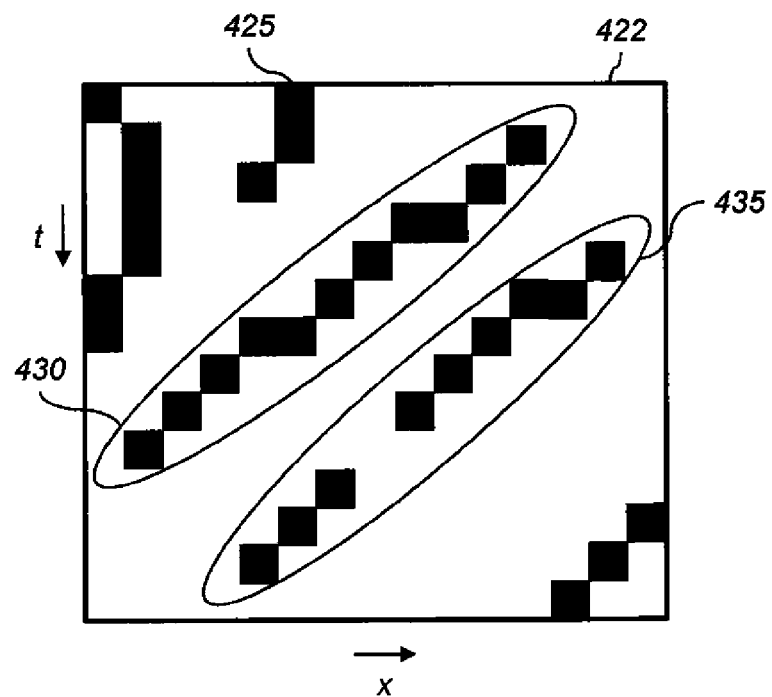
FIG. 5B shows a close up view of a portion of an edge map.

FIG. 5B shows a close up view of an edge map portion 422 containing edge pixels 425. A trajectory 430 is shown including a set of related edge pixels. In the trajectory 430, all of the edge pixels are connected to each other. In some embodiments, trajectories identified by the identify sets of related edge pixels step 410 (FIG. 4) can include a set of related trajectory segments, where the edge pixels within each trajectory segment are connected, but where there is a small gap between the trajectory segments. A trajectory 435 of this type is illustrated in FIG. 5B.

Figure 6:
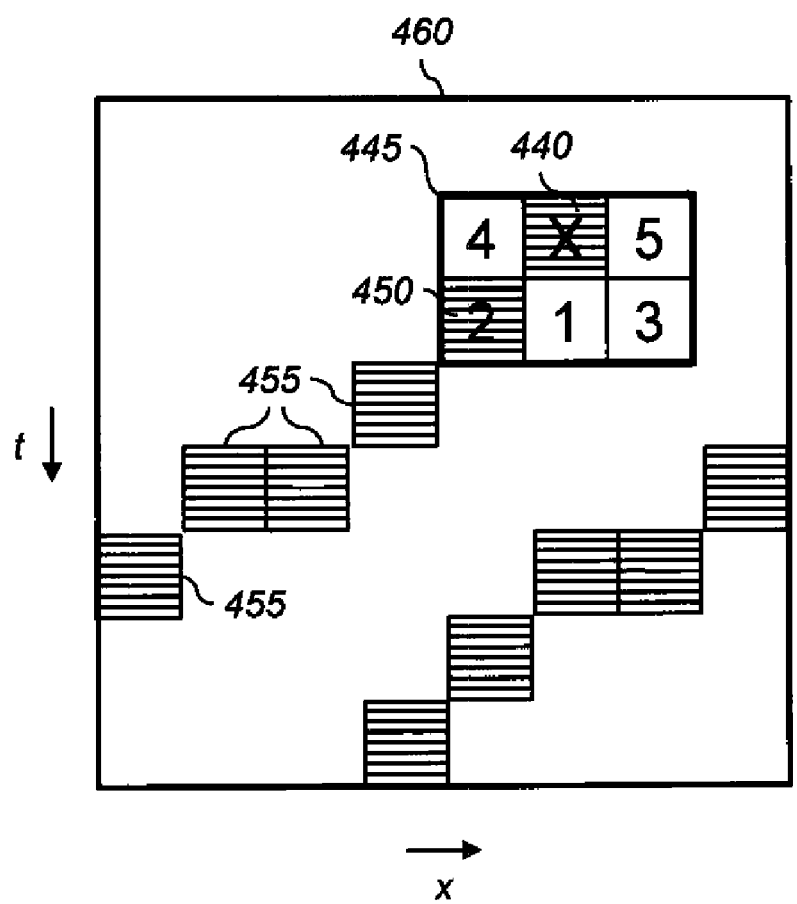
FIG. 6 illustrates a method for identifying trajectories in an edge map.

The identify sets of related edge pixels step 410 can use any method known in the art for identifying related structures in an image. Such methods are sometimes referred to as line tracing algorithms or curve tracing algorithms. In a preferred embodiment, the identify sets of related edge pixels step 410 (FIG. 4) uses the method illustrated in FIG. 6 to analyze the edge map 405 to identify the set of trajectories 230. In this example, an edge map portion 460 is shown where shaded pixels indicate that the pixel is an edge pixel, and white pixels indicate that the pixel is not an edge pixel. The algorithm sequentially scans through the rows of the edge map 405 (FIG. 4) until it encounters an edge pixel. The identified edge pixel will be the first trajectory pixel 440 for a new trajectory.

A search neighborhood 445 is searched to determine whether there are any other neighboring edge pixels that should be included in the trajectory. In this example, the search neighborhood 445 contains 5 neighboring pixel locations surrounding the current pixel (labeled "X"). A search order is defined specifying the order in which the pixels in the search neighborhood 445 are to be searched. In this example, the pixels in the search neighborhood 445 are labeled with numbers between 1 and 5 to indicate the search order. The first pixel to be searched is located directly below the current pixel, the second pixel to be searched is located below and to the left of the current pixel, and so forth. In the illustrated example, a second trajectory pixel 450 is found in the second search location. The second trajectory pixel 450 is then added to the trajectory, and the search neighborhood 445 is then moved to the location of second trajectory pixel 450. This process is repeated to identify additional trajectory pixels 455.

In a preferred embodiment, a trajectory map having the same size as the edge map is initialized to contain all zeros. As the edge pixels in the edge map 405 (FIG. 4) are identified to belong to a particular trajectory, the corresponding pixel locations in the trajectory map are assigned a number corresponding to the particular trajectory, and the corresponding edge pixels are set to zero in the edge map 405. When the last edge pixel in a particular trajectory has been identified, the sequentially scanning process picks up at the location the first trajectory pixel 440. When the next edge pixel is encountered, it will be assigned to the new trajectory and labeled accordingly in the trajectory map. According to this method, each edge pixel in the edge map 405 will be labeled as belonging to a particular trajectory. In alternate embodiments, the edge pixels included in each trajectory can be recorded using a method other than the trajectory map approach. For example, a set of pixel row and column addresses for the edge pixels included in each trajectory can be recorded in a list format.

In some embodiments, a larger search neighborhood 445 can be used in order to allow trajectory segments that may be separated by a small gap to be identified as belonging to the same trajectory (for example, see the trajectory 435 in FIG. 5B). In some embodiments, a search order different than the one shown in FIG. 6 can be used. The search order can be fixed, or alternately it can be set adaptively. For example, if the previously identified edge pixels in a particular trajectory indicate that the trajectory is generally moving toward the left of the image, then the search order can be altered to search the pixels to the lower left first.

Returning to a discussion of FIG. 4, a remove spurious trajectories step 415 can optionally be used to delete some of the identified trajectories that are likely to be spurious trajectories caused by noise introduced in the image capture or analysis process. In some embodiments, all trajectories having less than a minimum number of pixels are considered to be spurious trajectories and are removed from the set of trajectories. Additionally, in some embodiments, any horizontal trajectory segments longer than a specified length are also removed. These horizontal trajectory segments typically result from illumination changes in the scene. Other types of trajectories can also be determined to be spurious in various situations and can be removed. For example, some video cameras add a date and time field to the image frames that can cause vertical trajectories in specific locations, which can be identified and removed.

Once the trajectories 230 have been identified, the identify foreground and background trajectories step 235 (FIG. 2) is used to analyze the trajectories 230 to identify the foreground trajectory segments 240 and the background trajectory segments 250. The trajectory segments can be identified using any method known in the art. For example, the trajectories can be classified into different groups according to factors such as their orientation, spatial separation or shape similarity.

The background trajectory segments 250 will generally occur in a predominant pattern corresponding to the panning and zooming pattern for the video camera. The foreground trajectory segments 240 will correspond to the movement of foreground objects in the scene. In a preferred embodiment they are distinguished from the background trajectory segments 250 by identifying trajectory segments that are oriented in a direction different from the predominant trajectory segments. Other factors that can also provide clues as to whether a particular trajectory segment is a foreground trajectory segment 240 or a background trajectory segment 250 are the position of the trajectory segment within the image frame and the size and shape of groupings of trajectory segments that share a common orientation.

Figure 7:
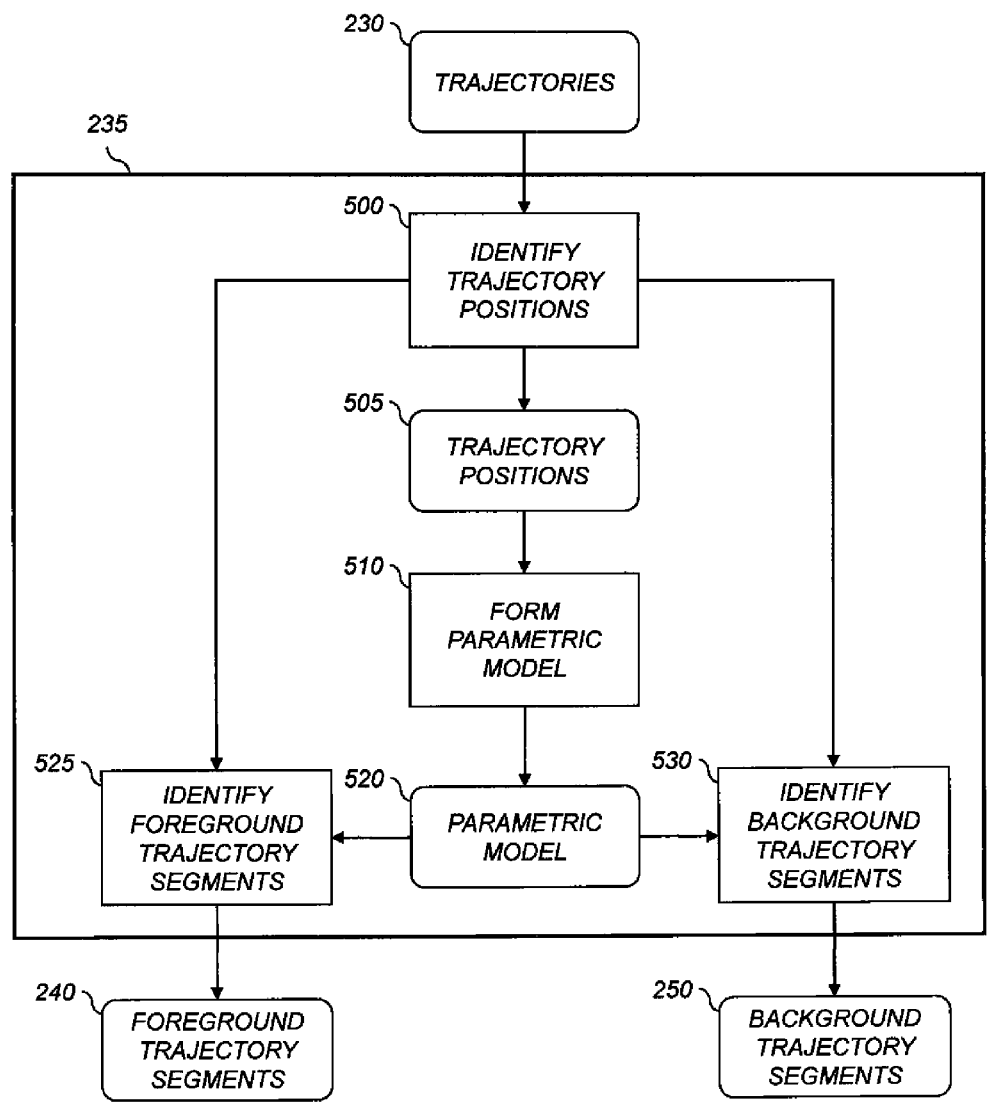
FIG. 7 is a flowchart showing additional details for the identify foreground and background trajectory segments step of FIG. 2 according to one embodiment.
Figure 8:
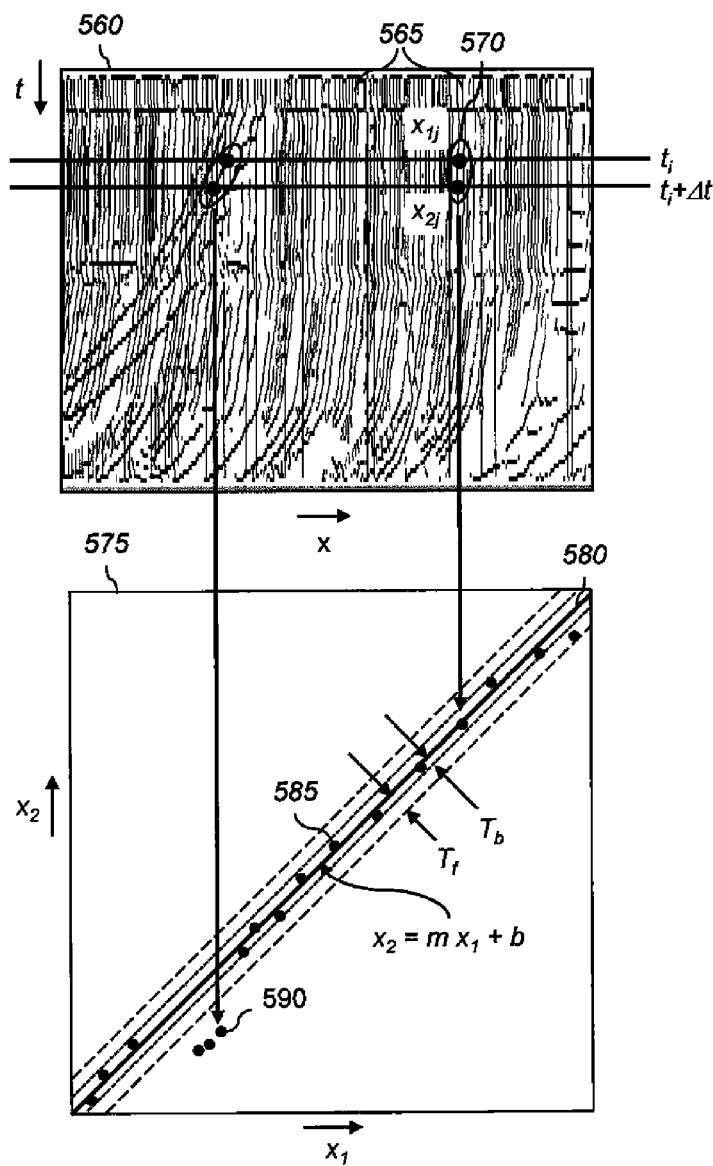
FIG. 8 illustrates the formation of a parametric model relating the spatial positions of the trajectories at two different times.

Visually, it is often straightforward for a human observer to view a trajectory map and identify the foreground trajectory segments 240 and the background trajectory segments 250. It can be much more challenging to automatically classify the trajectory segments by automatically analyzing the set of identified trajectories 230. FIG. 7 shows a flow chart for one embodiment of the identify foreground and background trajectory segments step 235, which can be used to automatically classify the trajectories 230. An identify trajectory positions step 500 is used to analyze the set of trajectories 230 to identify corresponding positions of the trajectories at first and second times. The first time ($t_i$) corresponds to a particular time where the trajectories are being evaluated, and the second time is chosen to be a predefined fixed time interval ($\Delta t$) later than the first time. In one embodiment, the second time is chosen to be a fixed number of image frames (e.g., 5) later than the first time. This is illustrated in FIG. 8, which shows a trajectory map 560, comprising a plurality of trajectories 565. A horizontal line is shown slicing through the trajectory map 560 at a first time $t_i$, corresponding to the time of the $i^{th}$ image frame. A second line is shown slicing through the trajectory map 560 at a second time $t_i+\Delta t$, corresponding to an image frame at a time $\Delta t$ later than the $i^{th}$ image frame. The first and second lines each intersect a series of trajectories 565. For each trajectory 565 that crosses both the first and second lines, the corresponding spatial positions 570 ($x_1$ and $x_2$) are determined. The set of spatial positions 570 for the trajectories that intersect the first and second lines comprise the trajectory positions 505 (FIG. 7).

Next, a form parametric model step 510 (FIG. 7) is used to determine fitting coefficients for a parametric model 520 relating the spatial positions of the trajectories at two different times by fitting a model to the determined trajectory positions 505. In a preferred embodiment, a linear parametric model of the form:

$$\hat{x}_2 = m\hat{x}_1 + b \quad (2)$$

is fit to the $x_1$ and $x_2$ spatial positions 570, where $\hat{x}_1 = x_1 - x_m$, $\hat{x}_2 = x_2 - x_m$, $x_m$ being a reference spatial position, and m and b are fitting parameters. This is illustrated by the trajectory position graph 575 in FIG. 8. In a preferred embodiment, the reference spatial position $x_m$ corresponds to the midpoint of the trajectory map 560. Each of the points represents the $x_1$ and $x_2$ spatial positions 570 for a particular trajectory 565 in the trajectory map 560. A parametric model 580 was determined by fitting a linear model of the form shown in Eq. (2) to the plotted data points. Methods for fitting parametric models to set of data points are well-known in the art. In a preferred embodiment a linear regression method is used to fit the data points using the well-known RANSAC (random sample consensus) strategy. Other methods for determining coefficients for the parametric models would include simple least squares regression and Hough transforms Returning to a discussion of FIG. 7, an identify foreground trajectory segments step 525 is used to designate segments of some of the trajectories to be foreground trajectory segments 240 based on the parametric model 520. Likewise, an identify background trajectory segments step 530 is used to designate segments of some of the trajectories to be background trajectory segments 250 based on the parametric model 520. In a preferred embodiment, the identify foreground trajectory segments step 525 and the identify background trajectory segments step 530 classify the trajectories by evaluating differences between the actual spatial positions of the trajectories and the spatial positions predicted by the parametric model.

Considering the example shown in FIG. 8, it can be seen that the data points corresponding to background trajectories are fit well by the parametric model 580, while the data points corresponding to foreground trajectories are not fit well by the parametric model 580. According to one embodiment, data points where a difference between the actual spatial positions of the trajectories and the spatial positions predicted by the parametric model is less than a specified background threshold $T_b$ are designated to be background trajectory segment points 585. Similarly, data points where the difference between the actual spatial positions of the trajectories and the spatial positions predicted by the parametric model is greater than a specified foreground threshold $T_f$ are designated to be foreground trajectory segment points 590. In some embodiments the background threshold $T_b$ and the foreground threshold $T_f$ may be the equal, but in other cases the foreground threshold $T_f$ can be specified to be larger than the background threshold $T_b$. In this case, some data points may not satisfy either criterion and are not classified to be in either category.

In a preferred embodiment, the values of the thresholds are predetermined using an empirical process by evaluating a set of typical video segments. However, in some embodiments the thresholds can be determined adaptively based on a statistical analysis of the trajectory position data. For example, well-known statistical methods for identifying outlier points in a set of data can be used to identify an appropriate foreground threshold $T_f$. The method described relative to FIG. 7 relies on the fact that the background trajectories will typically be the dominant trajectories so that data points corresponding to background trajectories are fit well by the parametric model 580. In some video segments 200 (FIG. 2), some or all of the image frames may be dominated by one or more foreground objects. In such cases, it may be desirable to use additional pieces of information to aid in the identification of the foreground trajectory segments 240 and the background trajectory segments 250. In some embodiments, one or more additional factors can be used combined with the results of the parametric model analysis to determine a probability that a given trajectory segment is a foreground trajectory segments 240 or a background trajectory segment 250. The trajectory segments can then be assigned according to the determined probabilities. For example, trajectory segments that are located toward the center of the image frame are more likely to be foreground trajectory segments 240. Similarly, trajectory segments that occur in a narrow band are more likely to be foreground trajectory segments 240. Also, if the trajectory segments in a particular neighborhood do not move in a consistent direction they are more likely to be foreground trajectory segments 240. In some embodiments, the trajectory assignments that were made for one time slice can be used in the classification of the trajectory segments in another time slice. For example, if a trajectory segment is reliably identified to be a background trajectory segment 250 in one time slice, then other trajectory segments in other time slices that are connected back to the previously identified background trajectory segment 250 are also likely to be background trajectory segments 250.

The method illustrated in FIGS. 7 and 8 can be repeated for a series of different times $t_i$. In many cases, a particular trajectory 230 will consistently be classified as either a foreground trajectory segment 240 or a background trajectory segment 250. In such cases, the entire trajectory 230 can be designated to be either a single foreground trajectory segment 240 or a single background trajectory segment 250. In other cases, a particular trajectory 230 may be classified as a foreground trajectory segment 240 for some time interval and as a background trajectory segment 250 for some other time interval. In such cases, the trajectory 230 can be split into multiple trajectory segments having the corresponding classifications.

The resulting set of background trajectory segments 250 can be analyzed to characterize the background motion as a function of time. The shape of the parametric model described with reference to FIG. 8 can provide important information about the background motion. If the video camera is undergoing a panning motion, the positions of the background trajectory segments will consistently be to the right (or to the left) at the second time relative to the first time. This would show up as a non-zero value of the fitting parameter b (corresponding to the "y-intercept" of the linear parametric model).

Similarly, if the video camera is undergoing a zooming operation, the background trajectories will either diverge or converge with time. This would show up as a value of the fitting parameter m (corresponding to the "slope" of the linear parametric model) that is not equal to 1.0. Values of m that are greater than 1.0 will correspond to the case where the video camera is "zooming in" for a more magnified view of the scene. Likewise, values of m that are less than 1.0 will correspond to the case where the video camera is "zooming out" for a less magnified view of the scene. It should be noted that the apparent zooming behavior is not necessarily tied to the adjustment of a zoom lens on the video camera. For example, the position of the photographer may be moving relative to the background in the scene.

Since the shape of the parametric model will be influenced by the presence of the foreground trajectory segment points 590, it will generally be desirable to refit the parametric model 580 using only the data points that were identified to be background trajectory segment points 585 in order to obtain a more accurate estimate of the background motion.

Figure 9:
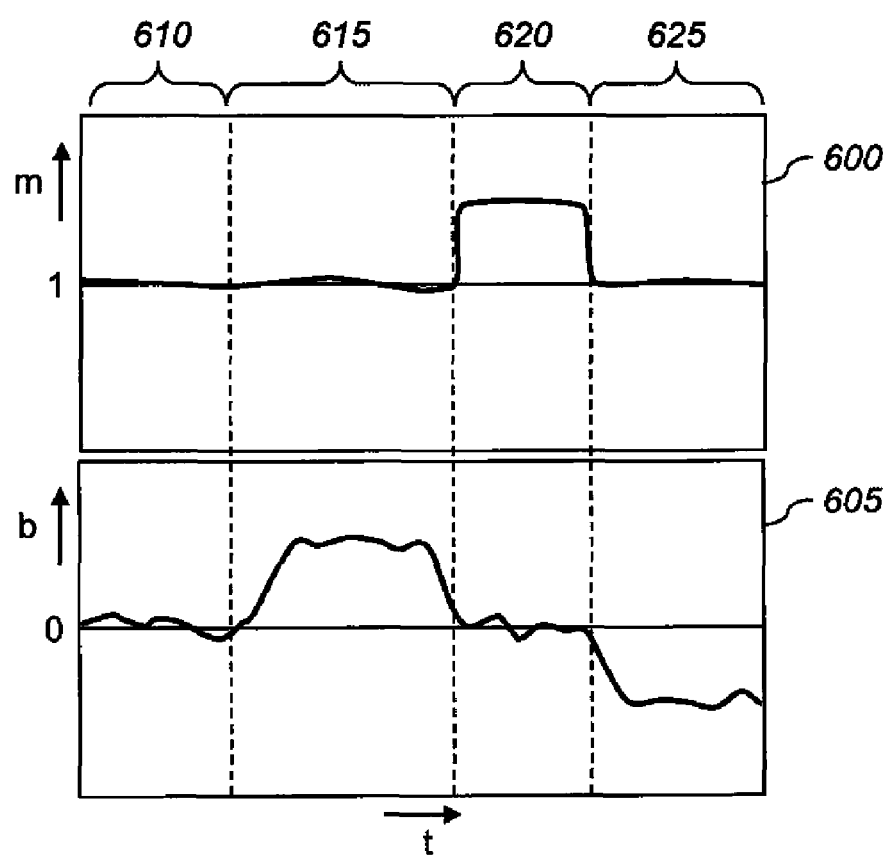
FIG. 9 shows graphs of the fitting parameters m and b as a function of time.

FIG. 9 shows graphs of the fitting parameters m and b as a function of time for an example digital video sequence. The graphs include a slope plot 600 which shows the value of slope fitting parameter, m, as a function of time, t, and an intercept plot 605 which shows the value of the intercept fitting parameter, b, as a function of time, t.

It can be seen that the graphs of FIG. 9 include a shaking motion section 610 where the slope is approximately equal to 1.0 and the intercept is approximately equal to 0.0. The small variations in the intercept and slope correspond to random small unintentional motions of the video camera during the video capture process (i.e., "camera shake"). The graphs also include a left panning section 615 where the slope is approximately equal to 1.0 and the intercept is greater than 0.0. This corresponds to the case where the background trajectories are moving to the right due to the video camera being panned to the left during the video capture process. A zooming section 620 indicates a region where the slope is greater than 1.0 and the intercept is approximately equal to 0.0. This corresponds to the case where the video camera was being zoomed in during the video capture process. Finally, a right panning section 625 indicates a region where the slope is approximately equal to 1.0 and the intercept is less than 0.0. This corresponds to the case where the video camera was being panned to the right during the video capture process. In some cases, the background motion pattern may indicate multiple types of motion. For example, the video camera may simultaneously be zoomed and panned.

In some applications, it may only be necessary to classify the type of background motion into a set of predefined classifications (e.g., panning motion, zooming motion, shaking motion, or a combination thereof). In some embodiments, the classification can be determined by evaluating a limited number of the background trajectory segments 250 rather than fitting a parametric function to the full set of background trajectory segments 250. For example, the sign and magnitude of the difference between the trajectory positions ($x_2 - x_1$) can be compared for the leftmost background trajectory segment and the rightmost background trajectory segment. If the differences for the leftmost background trajectory segment and the rightmost background trajectory segment are both positive, then it can be inferred that the background motion is a panning motion. Similarly, if the difference for the leftmost background trajectory segment is positive and the difference for the rightmost background trajectory segment is negative, then it can be inferred that the background motion is a zooming motion.

The store indication of background motion step 255 (FIG. 2) is used to store an indication of the background motion in a processor-accessible memory. In some embodiments, this can be done by storing a background trajectory map similar to the trajectory map 560 (FIG. 8) where all of the trajectory segments except for the background trajectory segments have been removed. In other embodiments, information characterizing the background motion determined by analyzing the background trajectory segments 250 can be stored. For example, the data shown in the slope plot 600 and the intercept plot 605 (FIG. 9) can be used as an indication of the background motion. Alternately, an indication of the type of background motion can be stored.

Figure 10:
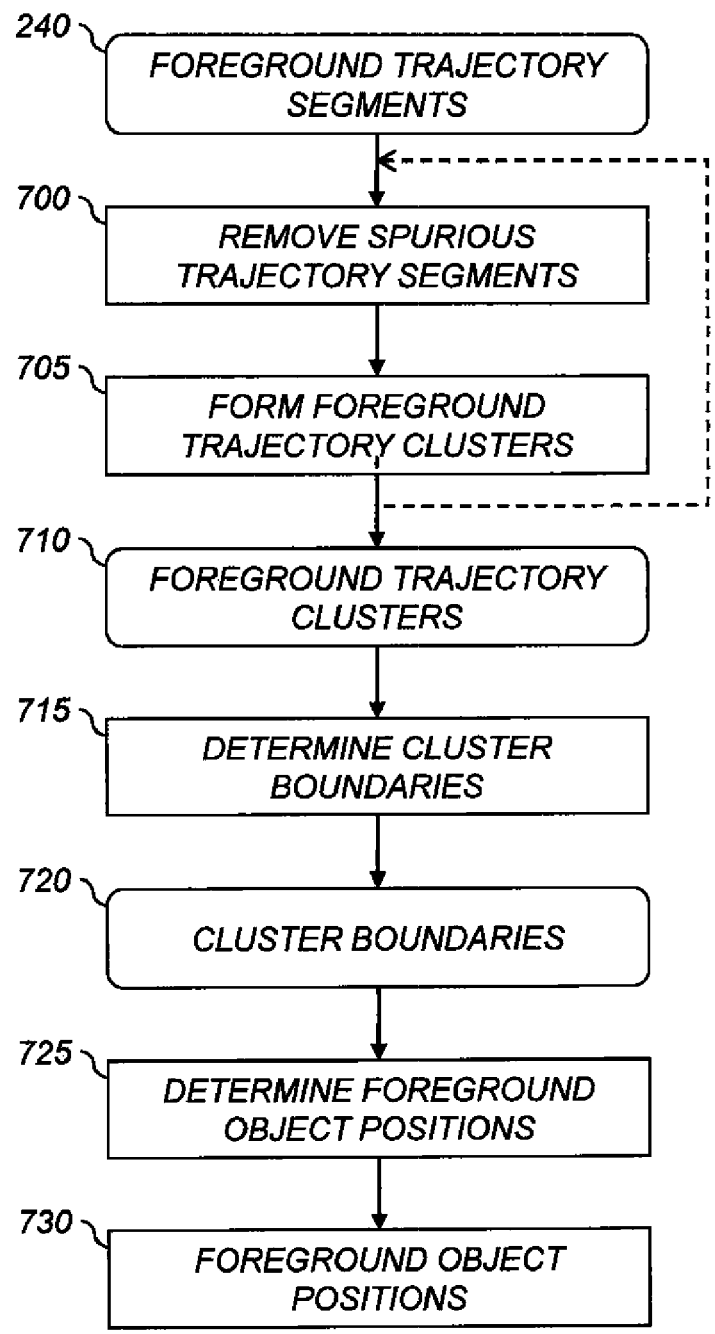
FIG. 10 is a flowchart illustrating the determination of foreground object positions by analyzing a set of foreground trajectory segments.

The identified foreground trajectory segments 240 (FIG. 2) can be further analyzed in various ways to determine information about the motion and position of moving foreground objects in the digital video sequence. One such method for analyzing the foreground trajectory segments 240 is shown in FIG. 10. A remove spurious trajectory segments step 700 is used to eliminate foreground trajectory segments 240 that are isolated or appear to be the result of random noise. In a preferred embodiment the remove spurious trajectory segments step 700 deletes any foreground trajectory segments that are likely to be spurious. As with the remove spurious trajectories step 415 discussed with reference to FIG. 4, spurious foreground trajectory segments can include foreground trajectory segments having fewer than a minimum number of pixels or purely horizontal foreground trajectory segments. Furthermore, foreground trajectory segments will generally not be purely vertical due to the fact that they will typically correspond to moving objects. As a result, in some embodiments purely vertical trajectory segments are also assumed to be spurious foreground trajectory segments. Similarly, other types of trajectories can also be identified to be spurious in various situations and can be removed. For example, isolated foreground trajectory segments that are not near to any other foreground trajectory segments can be assumed to be spurious foreground trajectory segments and can be removed.

Next, a form foreground trajectory clusters step 705 is used to cluster groups of nearby trajectory clusters that are likely to correspond to a particular foreground object (or to a group of foreground objects that are moving together). The form foreground trajectory clusters step 705 can use any clustering method known in the art. In a preferred embodiment the DBSCAN algorithm proposed by Ester et al. in the article "A density-based algorithm for discovering clusters in large spatial databases with noise" (Proc. Second International Conference on Knowledge Discovery and Data Mining, pp. 226-231, 1996) is used to form clusters of foreground trajectories. In one implementation, the DBSCAN algorithm is applied to a pixel map including all of the pixels that comprise the foreground trajectory segments 240, without regard to which trajectory they came from. It will be obvious to one skilled in the art that any other clustering algorithms known in the art, such as Gaussian Mixture Model clustering algorithms, Graph Cuts clustering algorithms or spectral clustering algorithms, can be used in accordance with the present invention.

In some embodiments, the form foreground trajectory clusters step 705 can be applied prior to the remove spurious trajectory segments step 700. In this case, the remove spurious trajectory segments step 700 removes spurious clusters of foreground trajectories rather than removing individual spurious foreground trajectories. In other embodiments, the remove spurious trajectory segments step 700 and the form foreground trajectory clusters step 705 can be applied multiple times so that spurious groups of foreground trajectories can be removed and related clusters of foreground trajectories can be clustered together to form larger clusters. In some cases, they can be applied iteratively until a stable set of foreground trajectory clusters 710 is obtained.

Figure 11:
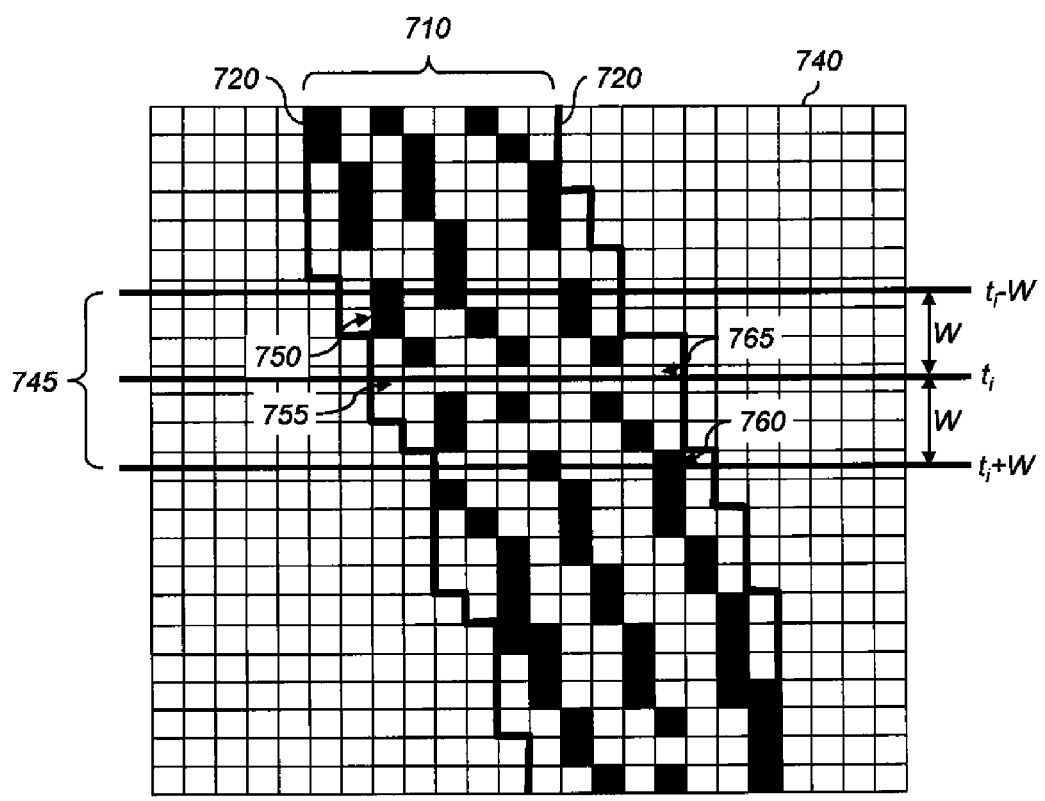
FIG. 11 illustrates a method for determining a cluster boundary.

Once the foreground trajectory clusters 710 have been formed, a determine cluster boundaries step 715 is used to determine a set of cluster boundaries 720. The determine cluster boundaries step 715 can use any method known in the art for determining a boundary around a set of points or curve segments. In a preferred embodiment the cluster boundaries are determined using the method illustrated in FIG. 11, which shows a portion of a foreground trajectory cluster map 740 containing a foreground trajectory cluster 710. The method works by scanning down the foreground trajectory cluster map 740 one line at a time. For a given line (corresponding to a time $t_i$) a window 745 is defined extending above and below the time 4 by a predefined interval width W. An interval width of W=5 has been found to produce reasonable results for many applications. However, other larger or smaller interval widths can also produced good results. (The example shown in FIG. 11 uses an interval width of W=3.) The use of the window 745 serves to fill in gaps or indentations which may exist in the foreground trajectory cluster 710. A search process is used to find the leftmost point 750 and the rightmost point 760 in the foreground trajectory cluster 710 within the window 745. The horizontal position of the leftmost point 750 is used to define the left boundary point 755 of the cluster boundary 720 at the time and similarly the horizontal position of the rightmost point 760 is used to define the right boundary point 765. This process is repeated for each $t_i$ to define the cluster boundary 720 for the foreground trajectory cluster 710. In some embodiments, the method illustrated in FIG. 11 can be repeated using vertical lines through the foreground trajectory cluster map 740 to define a second estimate of the cluster boundary 720. These two estimates can be combined to determine a more accurate cluster boundary 720. In one embodiment, the two estimated cluster boundaries are combined by finding the intersection of the two estimated cluster boundaries. In other embodiments, the determine cluster boundaries step 715 can use other methods for determining a boundary around a cluster of points, such as the well-known 2-D alpha shape algorithm.

Returning to a discussion of FIG. 10, a determine foreground object positions step 725 is used to determine foreground object positions 730 responsive to the cluster boundaries 720. It can be seen that a particular cluster boundary 720 provides an indication of the spatial position of the corresponding foreground object as a function of time. If the cluster boundary 720 is intersected with a horizontal line corresponding to a particular time (i.e., to a particular image frame), the leftmost and rightmost intersection points will provide an indication of the leftmost and rightmost extent of the corresponding foreground object in the image frame captured at that time. Therefore, the change in the location of the cluster boundary as a function of time provides an indication of the position of the corresponding foreground object as a function of time.

Figure 12:
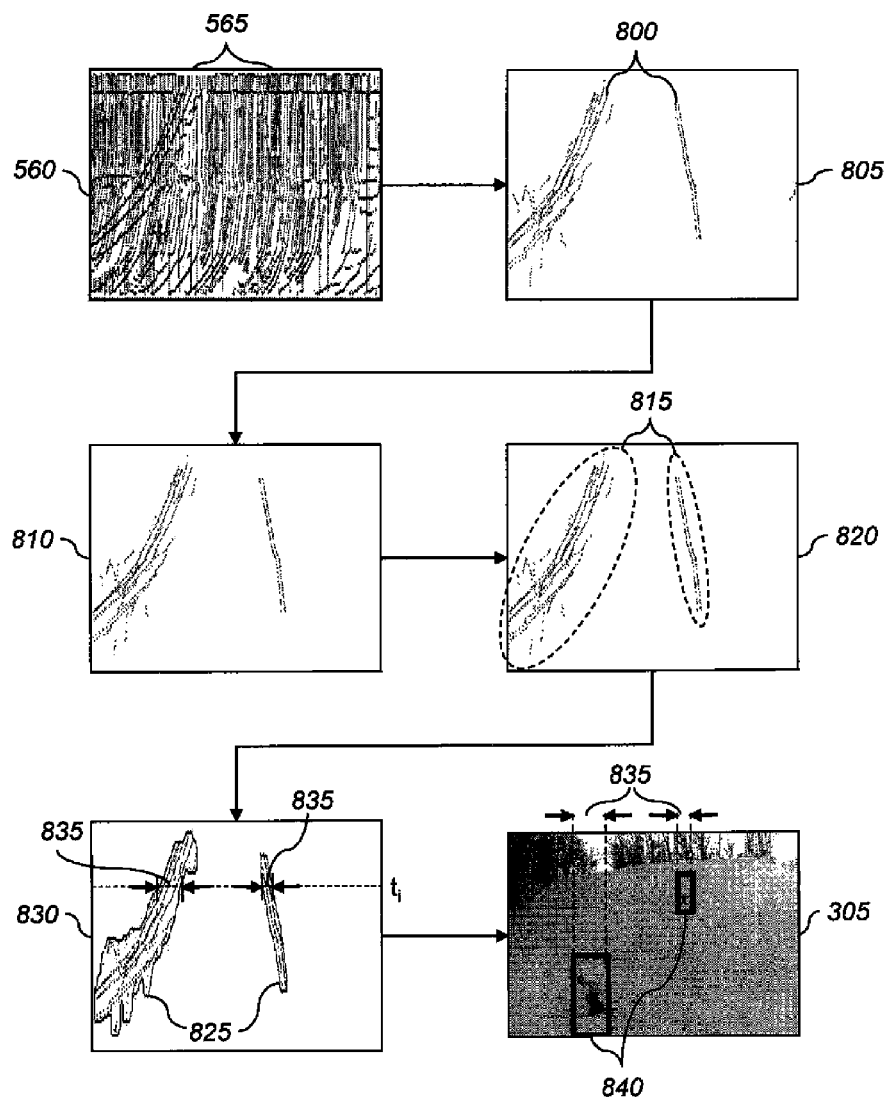
FIG. 12 illustrates an example of applying the method of FIG. 10 to an example trajectory map.

FIG. 12 shows an example of applying the method of FIG. 10 to an example trajectory map 560. The trajectories 565 in the trajectory map 560 are processed using the method of FIG. 7 to identify a set of foreground trajectory segments 800, which are shown in foreground trajectory map 805. The remove spurious trajectory segments step 700 is then applied to determine a denoised foreground trajectory map 810. The form foreground trajectory clusters step 705 forms foreground trajectory clusters 815, which are shown in foreground trajectory cluster map 820. The determine cluster boundaries step 715 determines foreground cluster boundaries 825 shown in foreground cluster boundary map 830. When the foreground cluster boundary map 830 is sliced horizontally at a position corresponding to time $t_i$, the foreground cluster boundaries 825 are intersected giving cluster positions 835, which provide an indication of foreground object positions 840 in the corresponding image frame 305.

Figure 2:
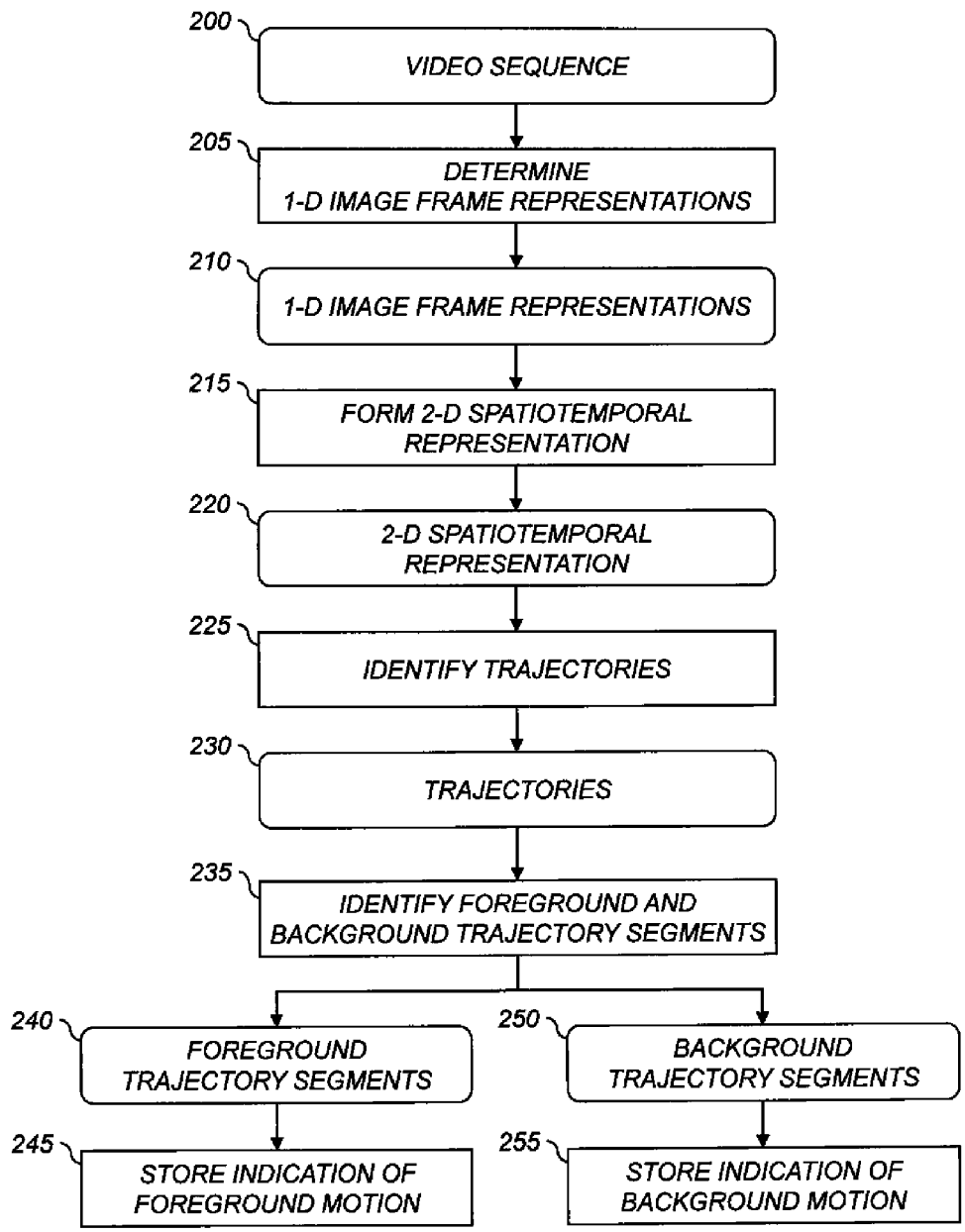
FIG. 2 is a flow chart of a method for determining foreground and background object motion according to a preferred embodiment.
Figure 13:
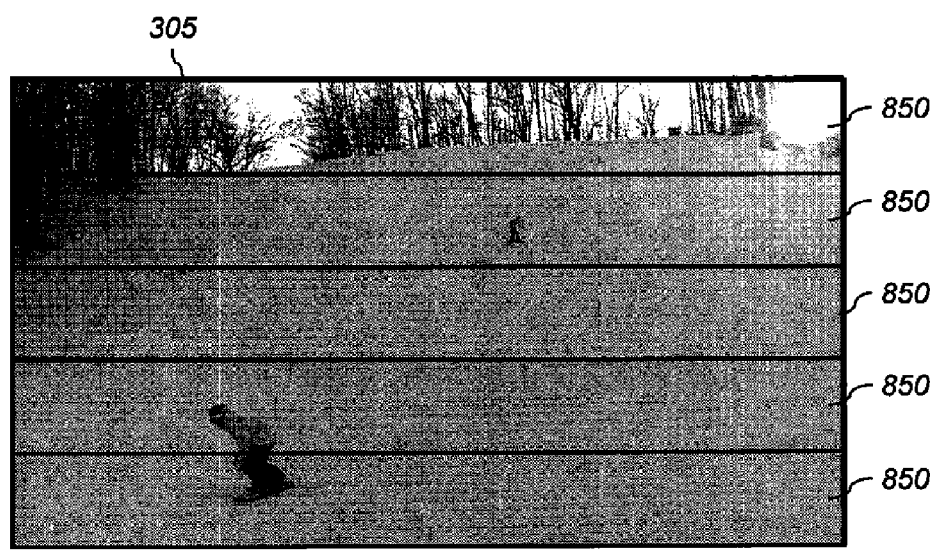
FIG. 13 illustrates a set of image frame segments.

The cluster positions 835 only provide information about the spatial position of the corresponding foreground object along the dimension used to form the 1-D image frame representations 210 (FIG. 2). To localize the spatial position of the foreground object in the other dimension, a number of different approaches can be used. In one embodiment, each image frame 305 is subdivided into a plurality of image frame segments 850 as shown in FIG. 13. The form 2-D spatiotemporal representation step 215 (FIG. 2) is then applied independently to each of the image frame segments 850 to determine a set of 2-D spatiotemporal representations 220. The identify trajectories step 225 (FIG. 2) is then applied independently to each of the 2-D spatiotemporal representations 220 to determine a set of trajectories 230 for each of the image frame segments 850. The sets of trajectories 230 for each of the image frame segments 850 are then combined into a single set of trajectories 230, where each of the trajectories 230 is marked to indicate which of the image frame segments 850 it came from. Then, during the process where the left boundary point 755 and the right boundary point 765 are determined using the method described in FIG. 11, the image frame segments 850 from which the various foreground trajectory segments 240 (FIG. 2) in the foreground trajectory cluster 710 can be evaluated. The uppermost and lowermost image frame segments 850 that contributed any trajectories within the window 745 can be used to define the upper and lower limits for the foreground object positions 840.

In other embodiments, the method of FIG. 2 can be applied a plurality of times, wherein 1-D image frame representations 210 are formed by performing integral transforms in a different direction in each case. For example, the integral transforms can be performed vertically as in the above described examples to localize the foreground object position in a horizontal direction. The integral transforms can then be performed horizontally to localize the foreground object position in a vertical direction. The foreground object position can then be localized by intersecting the horizontal and vertical positions.

Figure 14A:
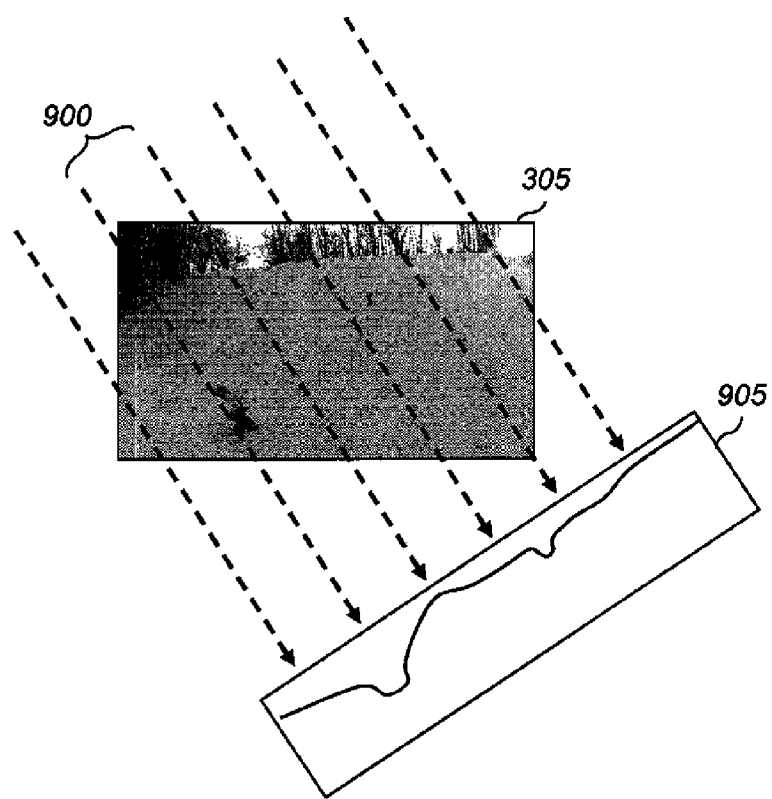
FIG. 14A illustrates the formation of an oblique 1-D image frame representation.

A complication that can arise with this approach is that in many cases the foreground objects may remain in a relatively stationary position vertically and only move in a horizontal direction. In this case, the trajectories determined using the horizontal integral transforms may not provide enough signal to differentiate the foreground trajectory segments 240 from the background trajectory segments 250 (FIG. 2). A variation of this approach that can mitigate this problem is to use one or more oblique integration paths along a direction that is at an oblique angle to the edges of the image frames rather than the horizontal integration path. This is illustrated in FIG. 14A which shows an oblique 1-D image frame representation 905 determined by performing the integral transform along oblique integration paths 900. Even if the foreground object has only a horizontal motion, there will be a resulting differentiation between the foreground and background trajectories. In this way, the spatial position of the foreground object can be localized in a direction perpendicular to the oblique integration paths 900.

Figure 14B:
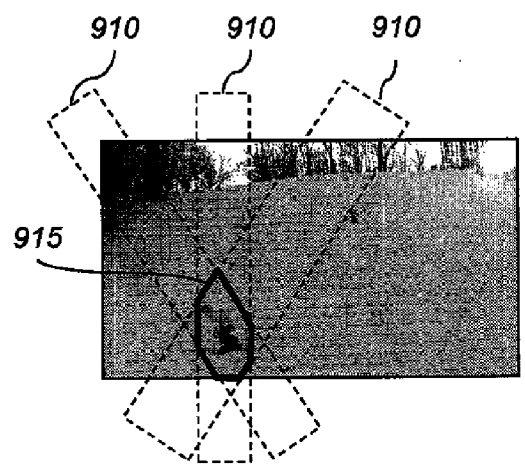
FIG. 14B illustrates the determination of a localized spatial position by intersecting spatial positions for a plurality of different integration directions.

FIG. 14B shows how a set of spatial positions 910 can be determined for a foreground object using integral transforms in a plurality of different directions. The intersection of the spatial positions 910 can be used to define a localized spatial position 915.

The information about the foreground and background motion determined according to the above described method can be used for a variety of different applications. For example, the information about the background motion can be used to address the common problem of camera shake during the capture of a video sequence.

There are several approaches known in the art to address camera shake during the capture of a video sequence. One method is to use an image stabilization system. Such methods typically use an inertial measurement device (e.g., a gyroscope or an accelerometer) to measure the motion of the image capture device during capture and then use a special lens with a lens element that can be moved laterally to cause the image formed by the lens on the image sensor to move in a direction that compensates for the image capture device motion. For example, U.S. Pat. No. 7,164,531 to Yamamoto, entitled "Image stabilization apparatus," describes an image stabilization system comprising an optical system where a portion of the optical elements are controlled to stabilize the optical image while the remaining optical elements are held in a predetermined position. In other embodiments, the image sensor itself can be moved laterally to compensate for the image capture device motion.

Another common approach that is used to provide a stabilized video sequence is to use digital shifting of individual image frames in a captured video sequence to compensate for motion of the digital video camera. The shifts that are applied to the individual image frames are determined by sensing the motion, either through the use of an inertial measurement device, or by digitally analyzing the captured image frames. One such method is described in U.S. Pat. No. 7,755,667, to Rabbani et al., entitled "Image sequence stabilization method and camera having dual path image sequence stabilization." While this method cannot reduce motion blur in a single frame, it is effective to stabilize a sequence of captured video images to reduce the effect of camera shake.

The information about the background motion sensed according to the method of the present invention can be used to provide a stabilized digital video sequence. In one embodiment, this can be done using the method shown in FIG. 14. The input video sequence 200 is analyzed using an extract background motion pattern step 920 to determine a background motion pattern 921. Preferably, the extract background motion pattern step 920 uses the method of FIG. 2 to form a 2-D spatiotemporal representation of the video sequence, and then to extract background trajectory segments 250 (FIG. 2). The background trajectory segments 250 can then be analyzed to determine a slope plot 600 and an intercept plot 605 as described with reference to FIG. 9. As was discussed earlier, the intercept plot 605 contains information useful for characterizing the motion of the video camera and can be used as a representation of the background motion pattern 921.

The background motion pattern 921 is analyzed using a determine undesired motion portion step 922 to determine an undesired background motion pattern 923. In a preferred embodiment, the undesired background motion pattern 923 corresponds to random motion patterns caused by an unintended camera shaking motion. This can be accomplished in any way known in the art for estimating a noise portion of a signal. In one embodiment, a low-pass filter is applied to the data of the intercept plot 605 (FIG. 9) to determine a smoothed intercept plot. The smoothed intercept plot will be an approximation of the intentional portion of the background motion pattern. A difference is then determined between the intercept plot 605 and the smoothed intercept to provide an estimate of the undesired background motion pattern 923.

In some applications, it may be known that all of the background motion is undesired background motion. For example, in a surveillance camera application, it may be known that the camera is mounted in a fixed location, but may be influenced by wind or other forces that may impart motion to the camera. In this case, the background motion pattern 921 can be used directly as the undesired background motion pattern 923. In this way, the background for all of the image frames will be aligned to the background for a first image frame.

A determine spatial shifts step 924 is used to determine spatial shifts 925 for each image frame appropriate to compensate for the undesired background motion pattern 923. For embodiments where the intercept plot 605 (FIG. 9) is used as a representation of the undesired background motion pattern 923, the intercept values will correspond to the number of pixels of offset that occur in the time interval Δt between the two time slices used to determine the trajectory position graph 575 (FIG. 8). These offsets can be scaled to determine a corresponding spatial offset between two successive frames (i.e., Δt=1 frame). The spatial shift 925 for a given frame can be determined to counteract this spatial offset. For example, if it is found that there is a two pixel undesired spatial offset to the right between two successive image frames, then the spatial shift 925 can be used to shift the image frame to the left to compensate. The undesired spatial offsets must be integrated between sequential frames to determine the spatial shift 925 appropriate for a particular image frame. Additional details for one method of determining spatial shifts to provide image stabilization based on estimated camera motion are described in the article "Automatic image stabilizing system by full-digital signal processing" (IEEE Transactions on Consumer Electronics, Vol. 36, pp. 510-519, 1990) by Uomori et al., which is incorporated herein by reference.

These steps can be performed twice using vertical and horizontal integration paths 310 (FIG. 3), to determine corresponding horizontal and vertical spatial shifts 925. The resulting spatial shifts 925 can be used to shift the image frames of the video sequence 200 using a shift image frames step 926, producing a stabilized video sequence 927. When an image frame is shifted in one direction, this can leave undefined pixels along one edge of the image frame. A number of methods can be used to address this issue. In some embodiments, the stabilized video sequence 927 has a smaller spatial resolution (i.e., a smaller number of pixels) than the original video sequence 200. In this case, after the spatial shifts 925 have been applied to the image frames, a central portion of the shifted image frames is cropped out to be used for the stabilized video sequence 927. In other embodiments, values for any undefined pixels are determined by replicating the edge pixels, or extrapolating values based on pixels near the edge of the image frame.

Figure 15:
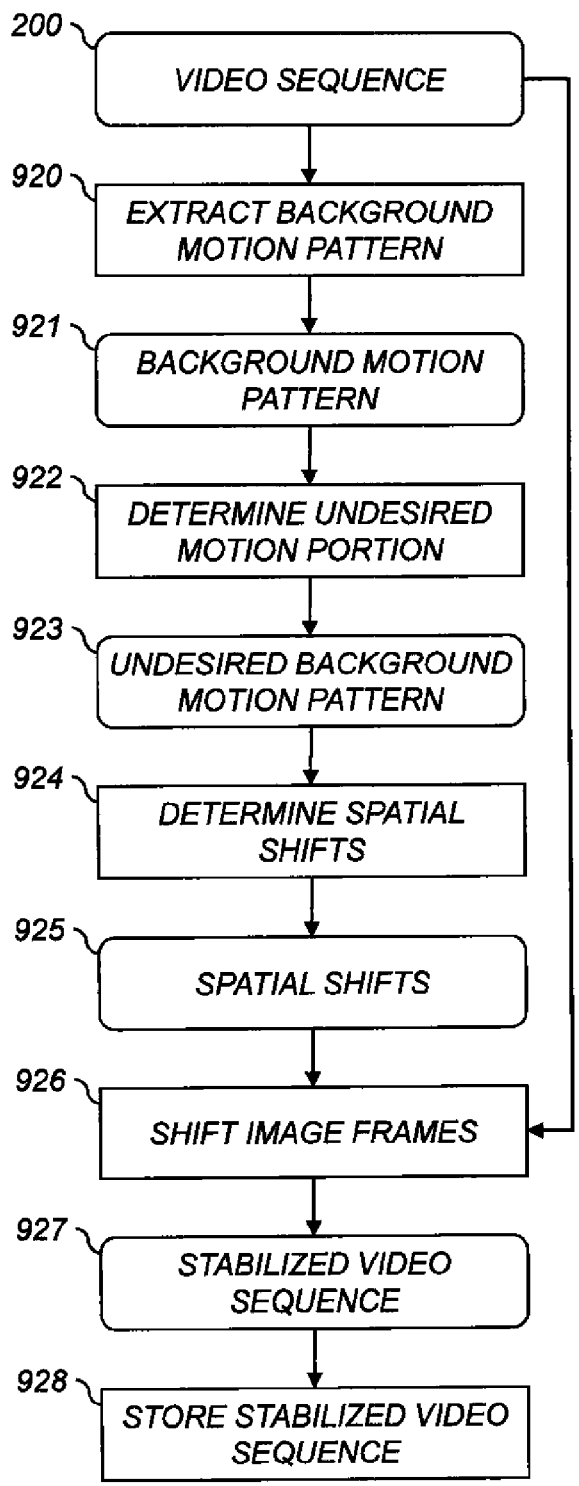
FIG. 15 is a flow chart illustrating a method for producing a stabilized video sequence.

In an alternate embodiment, a similar process can also be employed to stabilize the magnification of image frames to account for variations in the background magnification. (The variations in the magnification can come from various sources such as adjustment of the zoom lens or longitudinal movement of the video camera or background objects in the scene.) In this case, the slope plot 600 can be used to determine a magnification adjustment factor. This approach can be used to remove random variations in the magnification by determining a random motion portion of the slope plot 600 similar to what was described with reference to the determine undesired motion portion step 922 in FIG. 15. Alternately, all of the magnification and position variations can be removed to provide a registered video sequence.

A store stabilized video sequence step 928 is then used to store the stabilized video sequence into a processor-accessible memory such as a magnetic tape (e.g., a digital video tape), a hard disk or a RAM. In a preferred embodiment, the stabilized video sequence is stored using a conventional video storage format, such as the well-known MPEG video format. In some embodiments, rather than storing the actual shifted image frames of the stabilized video sequence 927, the stabilized video sequence 927 can be stored by storing the original video sequence 200, together with metadata indicating the spatial shifts 925 that should be used to provide the shifted image frames for the stabilized video sequence. The spatial offsets can then be applied at a later time, such as when the video sequence is played back.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
200 video sequence
205 determine 1-D image frame representations step
210 1-D image frame representations
215 form 2-D spatiotemporal representation step
220 2-D spatiotemporal representation
225 identify trajectories step
230 trajectories
235 identify foreground and background trajectories step
240 foreground trajectory segments
245 store indication of foreground motion step
250 background trajectory segments
255 store indication of background motion step
300 image frame
305 image frame
310 integration paths
320 row
330 background structure
335 foreground object structure
400 identify edge pixels step
405 edge map
410 identify sets of related edge pixels step
415 remove spurious trajectories step
420 edge map
422 edge map portion
425 edge pixels
430 trajectory
435 trajectory
440 first trajectory pixel
445 search neighborhood
450 second trajectory pixel
455 additional trajectory pixels
460 edge map portion
500 identify trajectory positions step
505 trajectory positions
510 form parametric model step
520 parametric model
525 identify foreground trajectory segments step
530 identify background trajectory segments step
560 trajectory map
565 trajectory
570 spatial positions
575 trajectory position graph
580 parametric model
585 background trajectory segment point
590 foreground trajectory segment point
600 slope plot
605 intercept plot
610 shaking motion section
615 left panning section
620 zooming section
625 right panning section
700 remove spurious trajectory segments step
705 form foreground trajectory clusters step
710 foreground trajectory clusters
715 determine cluster boundaries step
720 cluster boundaries
725 determine foreground object positions step
730 foreground object positions step
740 foreground trajectory cluster map
745 window
750 leftmost point
755 left boundary point
760 rightmost point
765 right boundary point
800 foreground trajectory segments
805 foreground trajectory map
810 denoised foreground trajectory map
815 foreground trajectory clusters
820 foreground trajectory cluster map
825 foreground cluster boundaries
830 foreground cluster boundary map
835 cluster position
840 foreground object positions
850 image frame segments
900 oblique integration paths
905 oblique 1-D image frame representation
910 spatial position
915 localized spatial position
920 extract background motion pattern step
921 background motion pattern
922 determine undesired motion portion step 923 undesired background motion pattern
924 determine spatial shifts step
925 spatial shifts
926 shift image frames step
927 stabilized video sequence
928 store stabilized video sequence step

The invention claimed is:

1. A method for analyzing a digital video sequence of a scene to extract background motion information and foreground motion information, the digital video sequence being captured by a digital video camera and having a time sequence of image frames, each image frame having a two-dimensional array of image pixels, comprising:

using a data processor to analyze at least a portion of a plurality of image frames captured at different times to determine corresponding one-dimensional image frame representations having an associated spatial dimension;

combining the one-dimensional frame representations for the plurality of image frames to form a two-dimensional spatiotemporal representation of the video sequence, one of the dimensions being a time dimension and the other dimension being the spatial dimension associated with the one-dimensional image frame representations;

using a data processor to identify a set of trajectories in the two-dimensional spatiotemporal representation of the video sequence, each trajectory corresponding to a structure in the two-dimensional spatiotemporal representation of the video sequence and representing the spatial position of a feature in the video sequence as a function of time;

using a data processor to analyze the set of trajectories to identify a set of foreground trajectory segments representing foreground motion information and a set of background trajectory segments representing background motion information; and storing an indication of the foreground motion information or the background motion information or both in a processor-accessible memory.

2. The method of claim 1 wherein the one-dimensional image frame representation is determined by applying an integral transform to at least a portion of the corresponding image frame.

3. The method of claim 2 wherein the integral transform includes summing the image pixels along a specified set of integration paths through the image frame.

4. The method of claim 2 wherein the integral transform includes summing the image pixels along rows or columns of the image frame.

5. The method of claim 1 wherein the one-dimensional image frame representation is determined by extracting a trace through the corresponding image frame.

6. The method of claim 1 wherein the process of identifying the set of trajectories includes:

determining a two-dimensional edge map identifying a set of edge pixels by applying an edge detection operation to the two-dimensional spatiotemporal representation of the video sequence; and analyzing the two-dimensional edge map to identify a plurality of trajectories, each trajectory corresponding to a set of related edge pixels.

7. The method of claim 6 wherein the set of related edge pixels are connected edge pixels.

8. The method of claim 1 wherein the set of background trajectory segments and the set of foreground trajectory segments are identified by:

forming a parametric model relating the spatial positions of the trajectories at two different times;

designating portions of the trajectories where a difference between the actual spatial positions of the trajectories and the spatial positions predicted by the parametric model is less than a specified background threshold to be background trajectory segments; and designating portions of the trajectories where the difference between the actual spatial positions of the trajectories and the spatial positions predicted by the parametric model is greater than a specified foreground threshold to be foreground trajectory segments.

9. The method of claim 8 further including analyzing the parametric model to estimate a motion pattern for the digital video camera.

10. The method of claim 9 wherein the parametric model is adjusted to removed the effect of the foreground trajectory segments before analyzing the parametric model to estimate the motion pattern for the digital video camera.

11. The method of claim 9 wherein the motion pattern includes a panning motion, a zooming motion, or a shaking motion, or a combination thereof.

12. The method of claim 1 further including analyzing the background trajectory segments to estimate a motion pattern for the digital video camera.

13. The method of claim 12 wherein the motion pattern includes a panning motion, a zooming motion, or a shaking motion, or a combination thereof.

14. The method of claim 1 further including the step of applying a denoising process to the identified set of foreground trajectory segments to remove spurious foreground trajectory segments.

15. The method of claim 1 further including the step of applying a clustering process to the identified set of foreground trajectory segments to form foreground trajectory clusters.

16. The method of claim 15 wherein the clustering process is a density-based clustering process.

17. The method of claim 15 further including:

determining boundaries for the foreground trajectory clusters; and determining spatial positions of moving foreground objects in the time sequence of image frames responsive to the boundaries of the corresponding foreground trajectory clusters.

18. The method of claim 17 wherein spatial positions of the moving foreground objects are determined for a plurality of different directions by using a plurality of one-dimensional frame representations determined by applying integral transforms along integration paths in a corresponding plurality of different directions, and wherein localized spatial positions of the moving foreground objects are determined by forming an intersection between the spatial positions determined for the plurality of different directions.

19. The method of claim 18 wherein the direction for at least one of the integration paths is at an oblique angle to the edges of the image frames.

20. The method of claim 17 wherein the image frames are divided into a plurality of portions, and wherein the set of trajectories is determined from a plurality of two-dimensional spatiotemporal representations determined for each of the image frame portions, and wherein the spatial positions of the moving foreground objects are further localized by determining which image frame portions contributed trajectories to the corresponding foreground trajectory clusters.

21. The method of claim 1 wherein the scene includes a static background and one or more foreground objects that are in motion relative to the background.

22. The method of claim 1 wherein the image pixels have a plurality of color values corresponding to a plurality of color channels.

23. The method of claim 22 wherein the one-dimensional frame representations are determined using color values from a single color channel.

24. The method of claim 22 wherein the one-dimensional frame representations are determined using a combined color values determined by combining the color values for a plurality of the color channels.

25. The method of claim 24 wherein the combined color channel is a luminance color channel.

26. A system for analyzing a digital video sequence of a scene to extract background motion information and foreground motion information, comprising:
   a data processing system; and
   a memory system communicatively connected to the data processing system and storing instructions configured to cause the data processing system to implement a method for analyzing the digital video sequence of the scene to extract the background motion information and the foreground motion information, the digital video sequence being captured by a digital video camera and having a time sequence of image frames, each image frame having a two-dimensional array of image pixels, wherein the instructions comprise:
      analyzing at least a portion of a plurality of image frames captured at different times to determine a corresponding one-dimensional image frame representation having an associated spatial dimension;
      combining the one-dimensional frame representations for the plurality of image frames to form a two-dimensional spatiotemporal representation of the video sequence, one of the dimensions being a time dimension and the other dimension being the spatial dimension associated with the one-dimensional image frame representations;
      identifying a set of trajectories in the two-dimensional spatiotemporal representation of the video sequence, each trajectory corresponding to a structure in the two-dimensional spatiotemporal representation of the video sequence and representing the spatial position of a feature in the two-dimensional spatiotemporal representation of the video sequence as a function of time;
      analyzing the set of trajectories to identify a set of foreground trajectory segments representing foreground motion information and a set of background trajectory segments representing background motion information; and
      storing an indication of the foreground motion information and the background motion information in a processor-accessible memory.

27. A computer program product stored on non-transitory tangible computer readable storage medium for analyzing a digital video sequence of a scene to extract background motion information and foreground motion information, the digital video sequence being captured by a digital video camera and having a time sequence of image frames, each image frame having a two-dimensional array of image pixels, comprising an executable software application for causing a data processing system to perform the steps of:
   analyzing at least a portion of a plurality of image frames captured at different times to determine a corresponding one-dimensional image frame representation having an associated spatial dimension;
   combining the one-dimensional frame representations for the plurality of image frames to form a two-dimensional spatiotemporal representation of the video sequence, one of the dimensions being a time dimension and the other dimension being the spatial dimension associated with the one-dimensional image frame representations;
   identifying a set of trajectories in the two-dimensional spatiotemporal representation of the video sequence, each trajectory corresponding to a structure in the two-dimensional spatiotemporal representation of the video sequence and representing the spatial position of a feature in the two-dimensional spatiotemporal representation of the video sequence as a function of time;
   analyzing the set of trajectories to identify a set of foreground trajectory segments representing foreground motion information and a set of background trajectory segments representing background motion information; and
   storing an indication of the foreground motion information and the background motion information in a processor-accessible memory.

* * * * *